United States Patent [19]

Koga et al.

[11] Patent Number: 5,160,761
[45] Date of Patent: Nov. 3, 1992

[54] METHOD FOR MAKING A MAGNETIC DISK

[75] Inventors: Keiji Koga; Jun-ichi Satoh, both of Saku; Kenji Yokoyama, Komoro; Akinori Nisizawa; Yasumichi Tokuoka, both of Saku, all of Japan

[73] Assignee: TDK Corporation, Tokyo, Japan

[21] Appl. No.: 856,703

[22] Filed: Mar. 24, 1992

Related U.S. Application Data

[62] Division of Ser. No. 635,211, Dec. 28, 1990.

[30] Foreign Application Priority Data

Dec. 29, 1989 [JP] Japan .................................. 1-342990
Sep. 4, 1990 [JP] Japan .................................. 2-233590

[51] Int. Cl.$^5$ .............................................. B05D 3/14
[52] U.S. Cl. ..................................... 427/548; 427/128; 427/130; 427/240; 427/335; 427/346; 427/385.5; 427/550; 428/64; 428/694; 428/900
[58] Field of Search ................. 427/48, 128, 130, 240, 427/335, 346, 385.5; 428/64, 336, 694, 900

[56] References Cited

U.S. PATENT DOCUMENTS 4,734,810  3/1988  Nakayama et al. ............... 360/135

FOREIGN PATENT DOCUMENTS

| | | |
|---|---|---|
| 52-28644 | 7/1977 | Japan . |
| 56-36497 | 8/1981 | Japan . |
| 57-12209 | 3/1982 | Japan . |
| 58-28651 | 6/1983 | Japan . |
| 60-59533 | 4/1985 | Japan . |
| 60-22416 | 6/1985 | Japan . |
| 61-3545 | 2/1986 | Japan . |
| 61-158030 | 7/1986 | Japan . |
| 61-248226 | 11/1986 | Japan . |
| 62-36729 | 2/1987 | Japan . |
| 62-14888 | 4/1987 | Japan . |

*Primary Examiner*—Bernard Pianalto
*Attorney, Agent, or Firm*—Oblon, Spivak, McClelland, Maier & Neustadt

[57] ABSTRACT

Information is magnetically recorded in and reproduced from a magnetic disk using a flying magnetic head. The disk is a coating type disk comprising a rigid substrate having a magnetic layer coated thereont from a magnetic coating composition of ferromagnetic submicron particles in a binder. High density recording is possible when the substrate has a surface roughness Ra of up to 0.007 μm, the magnetic layer has a thickness of up to 0.5 μm, a surface roughness Ra of up to 0.005 μm, and a porosity of 4 to 45%.

3 Claims, 4 Drawing Sheets

F I G. 3
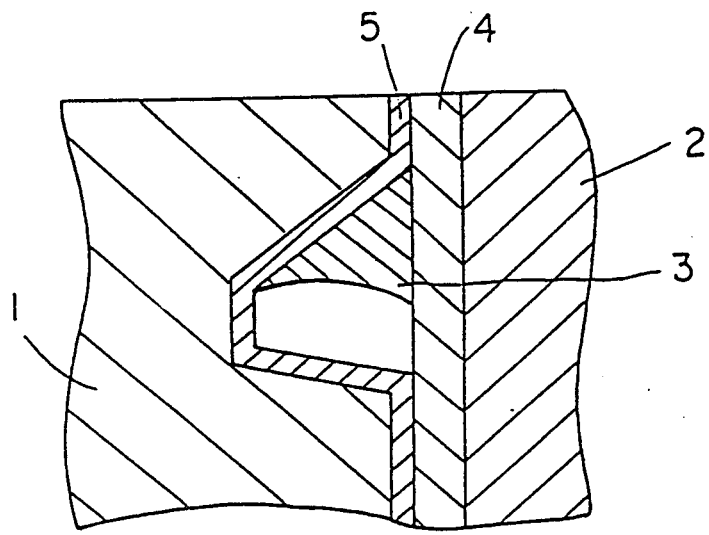
F I G. 4
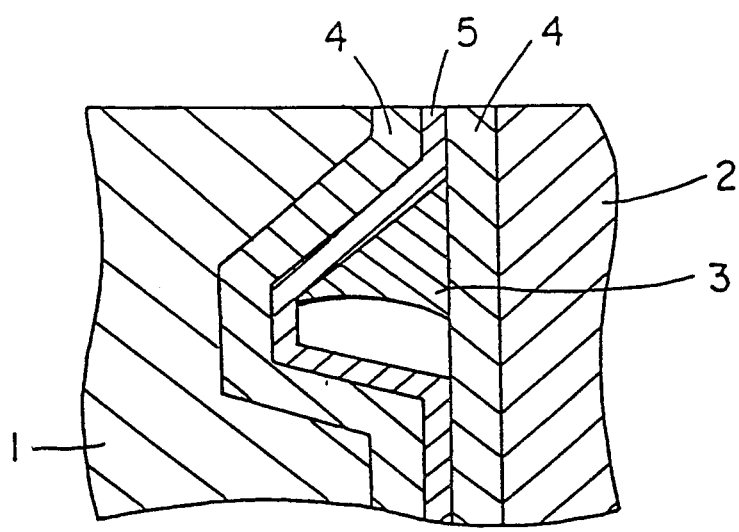

METHOD FOR MAKING A MAGNETIC DISK

This is a division, of application Ser. No. 07/635,211, filed on Dec. 28, 1990.

This invention relates to magnetic disks of the hard type, a method for preparing the same, and a magnetic information recording and reproducing process.

BACKGROUND OF THE INVENTION

Magnetic recording/reproducing equipment for computers or the like generally drives a magnetic disk of the hard type having a magnetic layer on a rigid substrate relative to a flying magnetic head for magnetic recording/reproducing purposes. To meet the recent general demand for higher capacity and compactness, there is the desire for magnetic disk equipment to have a higher recording density. In order that magnetic disks have a higher recording density, attempts have been made for the development of thinner, smoother magnetic layers having a higher coercive force. For magnetic heads, in turn, great efforts have been made toward the narrowing of the gap, higher saturation magnetic flux density, and closer floating of the slider.

Most magnetic hard disks used in the past were of the coating type in which a magnetic coating composition containing magnetic powder and a binder is applied onto a substrate to form a magnetic layer. The coating type magnetic disks are generally manufactured by spin coating the magnetic coating composition to a substrate, orienting the magnetic powder, and curing the coating. The magnetic powder used in these magnetic disks is most often $\gamma$-$Fe_2O_3$ magnetic powder because of reliability. In turn, the flying magnetic heads used for the recording/reproduction of coating type magnetic disks include ferrite magnetic heads of the monolithic and composite types and thin film type magnetic heads. However, it is difficult to substantially increase the recording density of such disks even when combined with high performance magnetic heads because $\gamma$-$Fe_2O_3$ magnetic powder has a coercive force as low as 300 to 800 oersted (Oe).

To meet a demand for increasing the capacity of magnetic disks, magnetic disks of the thin film type now find increasing use. The thin film type magnetic disks have magnetic thin films, also known as continuous thin films, which are formed by such techniques as sputtering and plating and feature excellent electromagnetic properties and an increased recording density.

The thin film type magnetic disks most often use modified substrates including aluminum alloy substrates having an Ni-P undercoat layer plated thereon or a hard oxide layer formed by anodization. A Cr under layer, a metallic magnetic layer such as a Co-Ni layer, and a protective lubricant layer of carbon or the like are consecutively deposited on the substrate by sputtering.

Despite excellent electromagnetic properties and high density recording capability, the thin film type magnetic disks suffer from the problem that the magnetic layer is less durable and prone to failure upon repetitive contact-start-and-stop (CSS) cycles because it has increased surface energy and low hardness and is difficult to apply a lubricant layer thereon. Also, a reliability problem arises because adhesion or seizure often occurs between the disk and the head as a result of increased friction therebetween. These problems become significant as the flying height of the flying head, that is, the spacing between the magnetic disk surface and the opposing surface of the flying magnetic head is reduced.

Another problem of the thin film type magnetic disks is economy in that the magnetic layers are generally made of expensive materials and require costly equipment such as a vacuum vessel for their formation. Further, because of the multiple-layered structure, the thin film type magnetic disks require a complex, time-consuming film forming process and are rather less adapted for efficient, mass scale production, leading to a further increase of cost.

Under these circumstances, one candidate for a durable or reliable magnetic disk amenable to efficient production in a mass scale and featuring a high recording density is a coating type magnetic disk using magnetic powder having a high coercive force, for example, ferromagnetic metal submicron particles and barium ferrite submicron particles.

In general, magnetic disks rely on the digital signal recording mode for carrying out saturation recording using 1f and 2f signals. In such recording and reproducing operation, a signal wave having a short wavelength of the order of 10 to 30 kFRPI is used as the 2f signal for increasing the recording density. With the use of such short wavelength signal waves, if magnetic layers are relatively thick, there arise problems including difficulty of saturation recording and lowerings of overwrite ability and recording density. Therefore, the magnetic disks are required to have thin magnetic layers.

In the case of coating type magnetic disks, however, it is difficult to reduce the thickness of magnetic layers. The difficulty of formation of thinner magnetic layers is aggravated particularly when the magnetic powder is magnetic submicron particles having a high coercive force. Since such submicron particles have a very small particle diameter and enhanced magnetization, they tend to agglomerate and are less dispersible in magnetic coating compositions. In practice, with the spin coating technique, it is almost impossible to reduce the film thickness to below 0.5 $\mu$m, especially below 0.3 $\mu$m.

In addition, the following problems arise. (1) It is impossible to form a magnetic layer of uniform thickness by spin coating because the magnetic layer is relatively thinner on the disk center side and relatively thicker on the disk peripheral side due to centrifugal force. (2) The magnetic layer is relatively rough on the surface. (3) The magnetic layer is less even in quality and insufficient in orientation so that its squareness ratio is relatively low. (4) Because of the uneven coating thickness, errors occur more often as the average layer thickness is reduced.

One solution to these problems is the coating method proposed in Japanese Patent Publication No. 28644/1977 wherein a magnetic coating composition is spin coated in the air which has been passed through the same solvent as the solvent of the composition. This coating method prevents drying of the magnetic coating composition during spin coating, achieving some improvements in the unevenness of thickness due to the streaking upon spinning off. However, the method is insufficient in thickness reduction and surface roughness of the magnetic layer and achieves only a less improvement in the uneven thickness that the magnetic layer is relatively thinner on the inner diameter side and relatively thicker on the outer diameter side of the disk.

Particularly when magnetic coating compositions containing ferromagnetic metal submicron particles or barium ferrite submicron particles are coated, the agglomeration of particles makes it more difficult to form thinner layers. One potential approach is to first form a relatively thick magnetic layer and reduce the thickness by abrasion. Where it is desired to reduce the layer thickness to below 0.5 μm, especially below 0.3 μm, abrasion can cause thickness irregularities and flaws, leading to increased modulation and occurrence of more errors during recording and reproducing operation.

Japanese Patent Publication Nos. 36497/1981, 12209/1982 and 14888/1987 disclose the manufacture of magnetic disks. After a magnetic coating composition is applied to a substrate, orientation is effected on the coating by applying thereto a magnetic field for coplanar orientation and another magnetic field having a perpendicular component. With this method, magnetic particles vibrate during orientation, resulting in a more uniform coating with a higher squareness ratio. In addition, a thinner magnetic layer can be formed than in the absence of the perpendicular orientation magnetic field. However, problems also arise where it is desired to further reduce the layer thickness. Still thinner magnetic layers have relatively high surface roughness, insufficient orientation, and low squareness ratio, leading to increased modulation and error rate during recording and reproducing operation.

This tendency is aggravated particularly when magnetic coating compositions containing ferromagnetic metal submicron particles and barium ferrite submicron particles are coated.

One approach to these problems is disclosed in Japanese Patent Application Kokai No. 248226/1986. A magnetic disk is manufactured by coating a substrate with iron oxide submicron particles, which have or have not been surface treated, to form a thin magnetic layer. Then, the iron oxide submicron particles in the layer are reduced to form a magnetic layer containing metallic submicron particles. The magnetic layer formed by this method, however, has an insufficient coercive force for high density recording. The magnetic layer is less resistant against weathering because it is difficult to form a stable passivated layer on the surface of metallic submicron particles.

Regarding coating type magnetic disks having magnetic layers with a thickness of up to 0.5 μm, especially up to 0.3 μm, the inventors have found that the electromagnetic properties and reliability of the magnetic disk system are largely affected by the surface roughness of both the magnetic layer and the substrate because the magnetic layer is quite thin. Since the magnetic disk system employs saturation recording, an increase in the surface roughness of the magnetic layer and substrate can directly affect the electromagnetic properties, giving rise to a serious problem, for example, a loss of S/N ratio during recording and reproducing operation. We have also found that the porosity of the magnetic layer largely affects the properties of the magnetic disk system.

SUMMARY OF THE INVENTION

Therefore, an object of the present invention is to provide a reliable magnetic disk having improved electromagnetic properties including S/N ratio and high density recording and CSS durability. Another object is to provide a method for preparing a magnetic disk having a magnetic layer which is thin and uniform and has a minimized surface roughness, low porosity, and improved electromagnetic properties. A further object is to provide a reliable magnetic recording and reproducing process which enables high density recording.

According to a first aspect of the present invention, there is provided a magnetic disk comprising a rigid substrate having a pair of opposed major surfaces and a magnetic layer formed on at least one major surface of the substrate by coating a magnetic coating composition containing magnetic submicron particles. The substrate on the one major surface has a surface roughness Ra of up to 0.007 μm. The magnetic layer has a thickness of up to 0.5 μm, a surface roughness Ra of up to 0.005 μm on the surface remote from the substrate, and a porosity of 4 to 45%.

Preferably, the magnetic layer has a coercive force of at least 1,100 Oe. The magnetic submicron particles are ferromagnetic metal submicron particles or hexagonal oxide submicron particles.

According to a second aspect of the present invention, there is provided a method for preparing a magnetic disk comprising the steps of: coating an annular rigid substrate with a magnetic coating composition containing magnetic submicron particles; applying a magnetic field to the coated substrate in a solvent vapor while rotating the substrate, thereby leveling the coating; and effecting orientation of the magnetic particles.

Preferably, after the step of effecting orientation, the coating is cured to form a magnetic layer having a thickness of 0.5 μm, a surface roughness Ra of up to 0.005 μm, and a porosity of 4 to 45%.

Preferably, the magnetic field applied for leveling the magnetic coating is a magnetic field created between opposed magnetic poles of opposite polarities transverse to the substrate. The magnetic field has a higher intensity near the inner perimeter than near the outer perimeter of the substrate.

According to a third aspect of the present invention, there is provided a process for magnetically recording and reproducing information in the magnetic disk of claim 1 using a flying magnetic head.

Preferably, the flying magnetic head defines a gap and has at least a gap adjoining portion made of a soft magnetic material having a saturation magnetic flux density of at least 0.7 T. Preferably, the flying magnetic head is at a spacing of up to 0.2 μm from the disk during operation.

In the magnetic disk of the invention including a magnetic layer having a thickness of up to 0.5 μm, the surface roughness (Ra) of the rigid substrate and the magnetic layer and the porosity of the magnetic layer are defined to the specific ranges. Since the magnetic properties of the magnetic layer having a significantly reduced thickness as compared with the prior art ones are largely affected by microscopic changes in the thickness of the magnetic layer by the surface state of the substrate and the magnetic layer, the S/N ratio during recording and reproducing operation can be significantly improved by limiting the surface state of the substrate and the magnetic layer. This also ensures high density recording and overwrite ability and improve CSS durability. Since the magnetic layer is formed by coating, the disk is efficient and low cost in production.

It is to be noted that Japanese Patent Application Kokai No. 82626/1984 discloses a thin film type magnetic disk having a Co-Ni-P film. An aluminum alloy substrate is plated with an Ni-P film, which is mirror finished to a surface roughness Ra in the range of 0.006 to 0.010 μm. In the thin film type magnetic disks, the magnetic layer is thin enough that its surface roughness directly reflects the surface roughness of the substrate. Then the floating stability of the associated head can be improved by controlling the surface roughness of the substrate. The lower limit of the surface roughness of the substrate is defined because head seizure can occur if the surface roughness of the substrate is extremely reduced.

In contrast, conventional coating type magnetic disks generally have a magnetic coating of about 1 $\mu$m or thicker so that the surface roughness of the substrate does not largely dictate the surface roughness of the magnetic layer or substantially affect the floating stability and electromagnetic properties. However, if the magnetic coating is substrate and the magnetic coating leads to microscopic changes in coating thickness. The present invention is based on the new concept of reducing such microscopic changes in coating thickness in a manner to improve electromagnetic properties for digital recording.

The method for preparing magnetic disks according to the present invention includes, after the step of coating a magnetic coating composition, the step of leveling the coating by applying a magnetic field to the coated substrate in the presence of a solvent vapor while rotating the substrate. The solvent vapor is effective for preventing the magnetic coating from drying during the leveling step. A magnetic field providing a higher magnetic field intensity near the disk center is effective in imparting a radially inward force to the magnetic submicron particles against a centrifugal force, thereby moving the magnetic coating radially inward. Then the magnetic coating is leveled or evenly extended so that a sufficiently thin magnetic layer can be formed even when the magnetic submicron particles used are ferromagnetic metal submicron particles and barium ferrite submicron particles which are otherwise likely to agglomerate. The resulting magnetic coating or layer is even in thickness from the inner perimeter to the outer perimeter of the substrate, smooth as represented by a minimal surface roughness, and low in porosity. The magnetic layer is homogeneous in that magnetic submicron particles are uniformly distributed or dispersed. In addition, the magnetic layer has a high squareness ratio because drying of the magnetic coating is avoided until orientation, allowing efficient orientation of magnetic submicron particles.

BRIEF DESCRIPTION OF THE DRAWINGS

The above and other objects, features, and advantages of the present invention will be better understood from the following description taken in conjunction with the accompanying drawings, in which:

FIGS. 3, 4 and 5 are fragmental cross sections of three different types of MIG magnetic head useful in the magnetic recording and reproducing process of the present invention.

DESCRIPTION OF THE PREFERRED EMBODIMENTS

Magnetic disk

Figure 1:
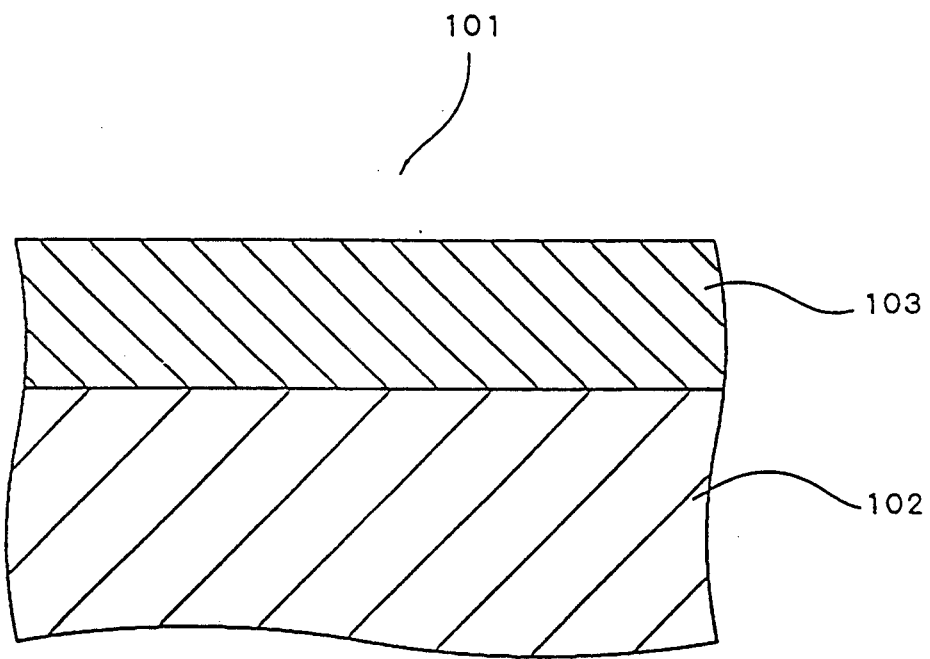
FIG. 1 is a fragmental cross section of a magnetic disk according to the present invention.

Referring to FIG. 1, there is illustrated in cross section a portion of a magnetic disk 101 according to the present invention. The magnetic disk 101 includes an annular rigid substrate 102 which supports a magnetic layer 103 coated thereon. The substrate has a pair of opposed major surfaces (only one is seen in FIG. 1).

The magnetic disks of the present invention encompass both magnetic disks of the one side recording type in which a magnetic layer is formed solely on one major surface of a rigid substrate and magnetic disks of the double side recording type in which a magnetic layer is formed on either surface of a rigid substrate.

The disk-shaped rigid substrates used herein may be formed of any desired non-magnetic materials including metals such as aluminum and aluminum alloys and glass, ceramics, and engineering plastics. Aluminum and aluminum alloys are preferred among others because of mechanical rigidity and ease of processing. The substrates may have any desired dimensions depending on a particular application, although they usually have a thickness of about 0.8 to about 1.9 mm and a diameter of about 60 to about 130 mm.

The substrates have a surface roughness Ra of up to 0.007 $\mu$m, preferably up to 0.006 $\mu$m. The lower limit of Ra is preferably 0.002 $\mu$m although careful attention need not be paid thereto. The S/N ratio during recording and reproducing operation is significantly improved when the substrate's Ra is within the above-defined range. Preferably, the maximum surface roughness Rmax of the substrate is from 0.005 to 0.070 $\mu$m. The surface roughness Ra used herein is as defined in JIS B0601, with a cutoff value of 0.17 mm and a measurement length of 0.5 mm. These values of Ra and Rmax can be achieved by various well-known polishing techniques.

The magnetic layer 103 is formed on the substrate 102 by applying thereto a magnetic coating composition containing magnetic submicron particles.

According to the invention, the magnetic layer should preferably have a coercive force of at least 1,100 Oe. Magnetic layers with a lower coercive force would not exhibit enough electromagnetic properties to achieve high density recording or to reproduce high outputs. It is desired that the coercive force of the magnetic layer be selected so as to provide satisfactory overwrite ability for any magnetic head to be combined therewith. The upper limit of coercive force is generally 2,000 Oe in this sense, though it need not be specified. More preferably, the coercive force of the magnetic layer ranges from 1,200 to 1,500 Oe.

According to the invention, the magnetic layer should have a thickness of up to 0.5 $\mu$m, preferably up to 0.3 $\mu$m. Beyond this thickness limit, no satisfactory overwrite ability is available, saturation recording becomes difficult particularly in the case of short wavelength recording, and an increased thickness loss provides an obstruction against high density recording. The lower limit of the layer thickness need not be specified although 0.05 $\mu$m or more is preferred to ensure satisfactory reproduction outputs and S/N ratio. More preferably, the thickness of the magnetic layer ranges from 0.08 to 0.3 $\mu$m.

The magnetic layer should have a surface roughness Ra of up to 0.005 μm, preferably from 0.001 to 0.003 μm on the surface remote from the substrate. The surface roughness Ra is as defined above. The S/N ratio during recording and reproducing operation is significantly improved when the magnetic layer's Ra is within the above-defined range. The surface roughness within the above-defined Ra range can be imparted to the magnetic layer typically by leveling the magnetic coating as will be described later and polishing the surface of the magnetic layer after curing. Various abrasive tools such as abrasive tape may be used for the polishing purpose. It is also possible to impregnate the magnetic coating with lubricant and vanish the coating until the desired Ra is reached.

The benefits of the invention are available when the surface roughness Ra of both the substrate and the magnetic layer are controlled to the above-specified ranges. If either one of the Ra values of the substrate and the magnetic layer is outside the range, recording and reproducing operation with a satisfactory S/N ratio is not expectable partly because the magnetic layer coating is as thin as 0.5 μm or less, especially 0.3 μm or less.

The magnetic layer on the surface has a porosity of 4 to 45%, preferably 5 to 40%, more preferably 6 to 30%.

It is well known that magnetic layers formed by coating inevitably contain more or less voids or pores. For magnetic layers having a thickness of up to 0.5 μm and a surface roughness Ra of up to 0.005 μm, if their porosity is lower than 4%, CSS durability becomes substantially lower by the occurrence of head seizure. A porosity in excess of 45% can adversely affect the homogeneity of the magnetic layer, resulting in a loss of S/N ratio and other electromagnetic properties. It will be understood that the porosity may be determined by image processing of a photomicrographic image under a scanning electron microscope (SEM) with a magnification of about ×50,000. The porosity in the above-defined range is achieved for the magnetic layer by leveling the magnetic coating as will be described later.

The magnetic submicron particles used in the magnetic layer are not particularly limited. Various oxide magnetic powders may be used although magnetic submicron particles having a high coercive force, for example, ferromagnetic metal submicron particles are preferred for high recording density and high recording/reproducing sensitivity. Any desired one may be selected from various ferromagnetic metal submicron particles insofar as the above-mentioned magnetic properties are obtained. Preferred are ferromagnetic metal submicron particles of elemental Fe, Co and Ni, alloys of two or more of these elements, optionally having incorporated therein an additional element which is selected from Cr, Mn, Co, Ni, Zn, Cu, Zr, Al, Ti, Bi, Ag, Pt, and equivalent elements and mixtures thereof. It is also possible to add a minor amount of a non-metallic element such as B, C, Si, P and N to these metal elements. Also included are partially nitrided metals such as $Fe_4N$.

Further, the ferromagnetic metal submicron particles may have an oxide coating formed on their surface for improving corrosion resistance and weatherability. The oxides used herein include oxides of the metals of which the ferromagnetic particles are made as well as various ceramic oxides such as $Al_2O_3$.

The magnetic metal submicron particles may have any desired shape although needle shape particles offering configurational magnetic anisotropy are preferred.

The dimensions of magnetic particles may be selected depending on the construction of an intended magnetic layer although particles having a major diameter or length of about 0.15 to 0.30 μm and an aspect ratio (length to breadth) of from about 6 to about 10 are preferred.

The ferromagnetic metal submicron particles may be prepared by any desired conventional well-known methods, for example, by reducing goethite α-FeOOH. Commercially available particles may also be used.

Other useful magnetic submicron particles having a high coercive force include hexagonal oxides such as barium ferrite and strontium ferrite. The dimensions of hexagonal oxide particles may be selected depending on the construction of an intended magnetic layer although particles having a mean particle diameter of up to about 0.15 μm, especially from 0.02 to 0.10 μm and a flakiness (average particle diameter divided by average thickness) of at least 2, especially from about 3 to about 10 are preferred.

The average particle diameter used herein is determined by taking an electron photomicrograph of particles, for example, of hexagonal barium ferrite under either a scanning electron microscope (SEM) or a transmission electron microscope (TEM), measuring the diameter of fifty (50) particles in cross section, and averaging the measurements. The average thickness is preferably determined by measuring the half-width of $2\theta$ from an X-ray diffraction pattern. The flakiness is then given as the average particle diameter divided by the average thickness.

The barium ferrites used herein include a hexagonal crystal barium ferrite conforming to $BaFe_{12}O_{19}$ and analogues, and partially substituted barium ferrites of the same formula wherein some Ba and Fe atoms are replaced by other metal atoms such as Ca, Sr, Pb, Co, Ni, Ti, Cr, Zn, In, Mn, Cu, Ge, Nb, Zr, Sn, etc. A mixture of them may be used. Also included are a hexagonal strontium ferrite conforming to $SrFe_{12}O_{19}$ and analogues, and similarly substituted ones. Mixtures of these barium and strontium ferrites may be used. Further, the ferromagnetic hexagonal oxide submicron particles may have a coating of oxides or organic compounds formed on their surface for improving dispersion and weatherability.

Barium ferrite and analogues may be prepared by any desired processes, for example, ceramic process, codeposition-firing process, hydrothermal synthesis process, flux process, glass crystallization process, alkoxide process, and plasma jet process. These processes are described in detail in an article by Y. Koike and O. Kubo, "Ceramics", 18, No. 10 (1983).

The magnetic coating composition used in forming the magnetic layer may be prepared by kneading the magnetic submicron particles and a binder along with a solvent.

The binder used herein is not particularly limited and it may be selected from thermosetting resins, reactive resins, and radiation curable resins, depending on a particular purpose. The thermosetting resins and radiation curable resins are preferred because a thinly applied layer should have satisfactory film strength and high durability.

Some illustrative non-limiting examples of the thermosetting resins include resins of condensation polymerization type such as phenol resins, epoxy resins, vinyl copolymer resins, polyurethane resins, urea resins, butyral resins, formal resins, melamine resins, alkyd resins, silicone resins, acrylic reactive resins, polyamide resins, epoxy-polyamide resins, saturated polyester resins, and urea-formaldehyde resins; mixtures of a high molecular weight polyester resin and an isocyanate prepolymer, mixtures of a methacrylate copolymer and a diisocyanate prepolymer, mixtures of a polyester polyol and a polyisocyanate, mixtures of low molecular weight glycol/high molecular weight diol/triphenylmethane triisocyanate, etc.; mixtures of any one of the foregoing condensation polymerization resins and a crosslinking agent such as isocyanates; mixtures of a vinyl copolymeric resin and a crosslinking agent; mixtures of a cellulosic resin such as nitrocellulose, cellulose acetobutyrate, etc. and a crosslinking agent; mixtures of a synthetic rubber such as butadiene-acrylonitrile, etc. and a crosslinking agent; and mixtures of any of the foregoing members.

Particularly preferred are mixtures of an epoxy resin and a phenol resin; mixtures of an epoxy resin, polyvinyl methyl ether, and methylol phenol ether as disclosed in U.S. Pat. No. 3,058,844; and mixtures of a bisphenol-A epoxy resin and an acrylate or methacrylate polymer as disclosed in Japanese Patent Application Kokai No. 131101/1974.

Illustrative radiation-curable resins are thermoplastic resins having contained or incorporated in their molecule groups capable of crosslinking or polymerizing upon exposure to radiation, for example, acrylic double bonds as given by acrylic and methacrylic acids having an unsaturated double bond capable of radical polymerization and esters thereof, allyl double bonds as given by diallyl phthalate, and unsaturated bonds as given by maleic acid and maleic derivatives. Other compounds having an unsaturated double bond capable of crosslinking or polymerizing upon exposure to radiation may also be used.

Preferred examples of the radiation curable binder include those resins having unsaturated double bonds in their molecule chain or at the end or in a side chain, saturated or unsaturated polyester resins, polyurethane resins, vinyl chloride resins, polyvinyl alcohol resins, polyvinyl butyral resins, epoxy resins, phenoxy resins, cellulosic resins, acrylonitrile-butadiene copolymers, and polybutadiene.

The radiation curable compounds which can be used herein in oligomer and monomer form include mono- or polyfunctional triazine acrylates, polyhydric alcohol acrylates, pentaerythritol acrylates, ester acrylates, urethane acrylates, and similar mono- or polyfunctional methacrylate compounds.

The proportion of the binder in the magnetic coating composition is not particularly limited although about 20 to about 50 parts by weight of the binder is preferably used per 100 parts by weight of the magnetic submicron particles.

The composition further contains a solvent which is not particularly limited as long as no deleterious effect is exerted. The solvent may be selected from ketones such as cyclohexanone and isophorone, alcohols such as isopropyl alcohol and butyl alcohol, cellosolves such as ethyl cellosolve and cellosolve acetate, aromatic solvents such as toluene, and equivalent solvents depending on the intended application. The proportion of the solvent in the magnetic coating composition is not particularly limited although about 400 to about 700 parts by weight of the solvent is preferably used per 100 parts by weight of the magnetic submicron-particles.

The magnetic coating composition may further contain an abrasive such as $\alpha$-$Al_2O_3$, a lubricant such as silicone fluid, and any other additives if desired.

The magnetic coating composition may be applied to the major surface of an annular rigid substrate which has been smoothed as by polishing. The surface of a rigid substrate may be either formed with an anodic oxide film such as anodic aluminum oxide, an oxidized film such as chromate, or an electroless deposition film such as Ni-P-Cu, or treated with a coupling agent or curing resin.

The coating method is not particularly limited although spin coating is useful in forming uniform coatings. The conditions of spin coating including revolutions and time may be properly selected depending on the desired thickness. Often, the substrate is rotated at 2,000 r.p.m. or higher, more preferably 3,000 r.p.m. or higher for spinning-off purposes. Slower revolutions are less desirable in forming a magnetic layer to a thickness of up to 0.5 $\mu$m, especially up to 0.3 $\mu$m. The spinning time is usually at least 2 seconds, preferably from 5 to 30 seconds. Shorter times are less desirable in forming a magnetic layer to a thickness of up to 0.5 $\mu$m. Too long times are less desirable because the coating on the surface is somewhat dried particularly near the inner perimeter of the substrate, adversely affecting leveling of the coating and orientation of magnetic particles.

The magnetic coating composition is preferably adjusted to a viscosity of 100 to 1,000 centipoise.

Where a spin coating apparatus can also serve as a leveling apparatus to be described later, spin coating can, of course, be effected in a solvent vapor.

The application of the magnetic coating composition is followed by leveling of the magnetic coating which is effected by applying a magnetic field to the coated substrate-in a solvent vapor while rotating the substrate.

Figure 2:
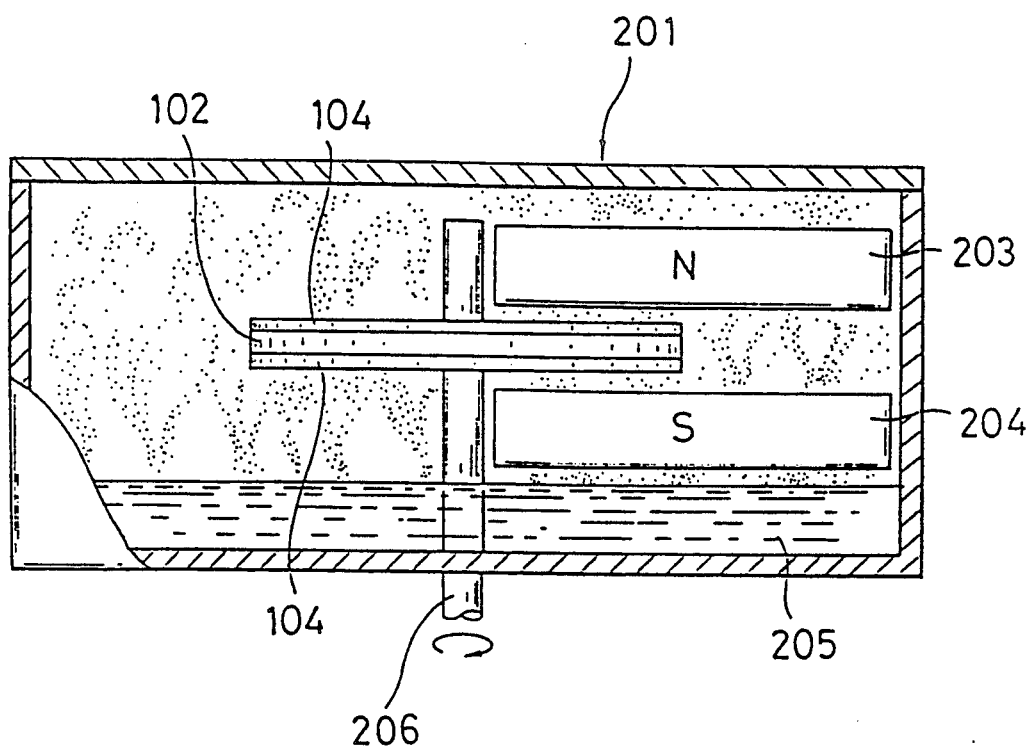
FIG. 2 is a schematic cross section of an apparatus for leveling the magnetic coating in one step of a magnetic disk manufacturing method according to the present invention.

One preferred exemplary leveling apparatus is shown in FIG. 2 although the invention is not limited thereto. The apparatus includes a closed container 201 having a low boiling solvent 205 received therein for establishing a solvent vapor-containing atmosphere therein, a pair of opposed magnets 203, 204 disposed therein, and a drive shaft 206 mounting a substrate 102 having a magnetic coating 104 applied thereon for rotating the substrate 102 between the magnets 203, 204.

More particularly, a magnetic field acts on a substrate 102 having magnetic coatings 104 coated thereon. The direction of the applied magnetic field is generally perpendicular to the major surface of the substrate 102 although some inclination is acceptable. A horizontal magnetic field is ineffective for leveling purposes because a force acts on the coating parallel to its surface. The magnetic field applied preferably has an intensity of 500 to 3,000 G in the magnetic coating 104. A magnetic field with a less intensity cannot provide a sufficient force to move the coating, resulting in less leveling whereas the surface of the coating is adversely affected by a too intense magnetic field. The intensity of the applied magnetic field in the magnetic coating should preferably increase continuously or stepwise from the outer perimeter to the inner perimeter of the annular substrate 102 and reach the maximum near the inner perimeter of the substrate 102.

To create such a magnetic field, a pair of rod-shaped magnets 203 and 204 magnetized on their major surfaces are spaced such that the substrate 102 is interposed between the opposite poles. In FIG. 2, the substrate 102 is situated between the N pole of upper magnet 203 and the S pole of lower magnet 204 so that the lines of magnetic force extend through the coatings 104 at right angles. An edge portion of each magnet having a higher intensity is disposed near the inner perimeter of the substrate and an intermediate portion of each magnet having a lower intensity disposed near the outer perimeter of the substrate. The magnets used herein may be either permanent magnets or electromagnets which are energized by a DC power supply. The parameters of the magnets including maximum energy product (BH)max and dimensions may be determined in accordance with the size of the substrate, the magnetic field intensity and the spacing between the substrate and the magnets. Often, the magnets have a (BH)max value of about 16 to 30 MGOe, dimensions of 10×65 mm, and a spacing from the substrate of about 5 to 20 mm. The number of opposed magnets 203, 204 is not limited to one pair and two to six pairs of opposed magnets may be used.

The application of a magnetic field is not limited to the illustrated mode. For example, a single magnetic pole may be disposed only on one side of the substrate to apply a magnetic field which traverses the magnetic coating in a perpendicular direction.

In the practice of the invention, leveling of the magnetic coating is carried out in an atmosphere having a solvent vapor in solution with air. Any desired solvent may be used herein as long as it can be used in the preparation of the magnetic coating. A mixture of such solvents is also contemplated. The atmosphere is at a temperature of 20° to 50° C. The atmosphere preferably contains 30 to 90% by volume of the solvent vapor. Instead of air, the atmosphere may be an inert gas such as nitrogen and argon. The solvent vapor may be introduced in the atmosphere by any desired method.

In the FIG. 2 embodiment, a low-boiling solvent 205, typically cyclohexanone is received in the closed container 201 and heated to a temperature of about 35° C. by means of a heater to generate solvent vapor, providing a desired atmosphere. Instead, the solvent may be evaporated by ultrasonic vibration or bubbling as well as spontaneous evaporation.

Under the above-mentioned conditions, the substrate 102 is rotated by the drive shaft 206, preferably at 200 to 2,000 r.p.m. With slower revolutions, the component of the force acting on the coating in a tangential direction to the substrate (disk) circumference is reduced, resulting in insufficient leveling. With rotational speeds beyond 2,000 r.p.m., the centrifugal force causes the coating thickness to become thinner at the inner perimeter than at the outer perimeter, also resulting in insufficient leveling. The rotating time is preferably 5 seconds or longer, more preferably from 10 to 120 seconds. Excessively long rotation is unnecessary.

While the substrate 102 is rotated under the above-mentioned conditions, the magnetic submicron particles in the magnetic coating 104 are magnetically drawn on every revolution in a substrate (disk) tangential direction and toward the inner perimeter where the magnetic field is of higher intensity. Along with the movement of magnetic submicron particles, the magnetic coating is moved toward the inner perimeter. In this way, the magnetic coating 104 which is relatively thin near the inner perimeter and thick near the outer perimeter and has an irregular surface in the as-coated state is leveled to a uniform thickness and smoothed at the surface. At the end of leveling, the coating is satisfactorily homogeneous.

The leveling in an atmosphere having a solvent vapor dissolved therein has an additional advantage that the presence of solvent vapor prevents the magnetic coating from drying or allows a dry portion of the coating, if any, to swell again, resulting in a further improvement in the surface smoothness of the magnetic coating. Consequently, polishing and other processing after curing can be simplified.

The magnetic coating is thus prevented from drying until immediately before orientation, allowing magnetic submicron particles to be effectively orientated. There is obtained a magnetic layer having a higher squareness ratio S and a higher coercive force squareness ratio S*, for example, a ratio S of at least 0.8 and a ratio S* of at least 0.7.

The above-defined leveling makes it possible to limit the surface of the magnetic coating or layer to the Ra range defined herein.

After the magnetic coating is applied and leveled as above, it is subjected to orientation of magnetic submicron particles. The magnetic coating is preferably oriented such that the axis of easy magnetization of magnetic submicron particles is aligned with a circumferential direction of the substrate or disk. To this end, the magnetic disk is rotated between a pair of magnets which are disposed on opposite sides of a magnetic coating such that the poles of the same polarity face each other.

The orienting magnetic field preferably has an intensity of about 2,000 to 4,000 G in the coating. One to six pairs of magnets may be used. The substrate or disk is rotated at about 100 to 500 r.p.m. The orienting atmosphere may or may not contain a solvent vapor.

After orientation, the coating is dried and then cured for hardening. For thermosetting resin binders, curing parameters including heating temperature and time may be properly determined for a particular type of binder although curing is usually effected for 1 to 5 hours at a temperature of 150° to 300° C. For radiation curable resin binders, a radiation source may be set to provide a dose of 3 to 10 Mrad at room temperature. The atmosphere for curing may be an inert gas atmosphere, preferably a nitrogen atmosphere.

In this way, there is obtained a magnetic layer which is extremely thin and uniform and has a reduced surface roughness and a reduced porosity. For example, the magnetic layer available after curing of the magnetic coating has a thickness of up to 0.5 $\mu$m, especially up to 0.3 $\mu$m, a difference in film thickness between the outer and inner perimeters of up to 10%, and a surface roughness of up to 0.1 $\mu$m in maximum height Rmax. Consequently, the subsequent polishing step can be simplified, resulting in further improvements in mass production and efficiency.

Subsequent to curing, the magnetic layer is preferably subjected to surface polishing. Various abrasive means, typically abrasive tape may be used. This polishing can adjust the surface roughness Ra of the magnetic layer to the desired value as well as its thickness. It is to be noted that since the surface roughnesses Ra and Rmax are fully low at the end of curing as mentioned above, polishing can adjust the surface roughness Ra of the magnetic layer to 0.005 $\mu$m or less, especially 0.003 $\mu$m or less, and Rmax to 0.02 $\mu$m or less.

Subsequent to polishing, a liquid lubricant is preferably applied to the surface of the magnetic layer such that the layer is impregnated therewith. The liquid lubricant used herein is not particularly limited although liquid lubricants based on fluorinated organic compounds are preferred for high lubricity. The liquid lubricant may be applied by any desired method, for example, dipping and spin coating. It will be understood that the liquid lubricant may be previously incorporated in the magnetic coating composition.

Subsequent to the impregnation of liquid lubricant, vanishing is preferably effected to further improve the surface smoothness of the magnetic disk.

Magnetic head

The flying magnetic head used herein defines a gap in a conventional manner and preferably has at least a gap adjoining portion made of a soft magnetic material having a saturation magnetic flux density of at least 0.7 tesla (T).

Preferred flying magnetic heads are magnetic heads of the metal-in-gap (MIG) type and magnetic heads of the thin film type.

The MIG type magnetic head includes a pair of cores having opposed surfaces defining a gap therebetween and a soft magnetic thin film having a higher saturation magnetic flux density than the cores disposed on at least one of the gap-defining opposed surfaces. The MIG type magnetic head allows for effective recording on magnetic layers having high coercivity because an intense magnetic flux can be applied across the magnetic layers from the soft magnetic thin film.

FIGS. 3 and 4 schematically illustrate two preferred embodiments of the MIG type magnetic head used herein.

The magnetic head shown in FIG. 3 includes a pair of first and second cores 1 and 2 having opposed surfaces defining a gap 5 therebetween. A soft magnetic thin film 4 is formed on the gap-defining surface of the second core 2. The cores 1 and 2 are integrally joined through the gap 5 with the aid of a glass fusion weld 3. Where the soft magnetic thin film is disposed solely on one of the cores as in FIG. 3, it is preferred to form the thin film on the trailing core.

The magnetic head shown in FIG. 4 has a soft magnetic thin film 4 on each of the gap-defining opposed surfaces of the first and second cores 1 and 2.

The cores are preferably formed of a ferrite. The ferrite used herein is not particularly limited although a choice is preferably made of an Mn-Zn or Ni-Zn ferrite.

The cores preferably have a saturation magnetic flux density Bs of 0.3 T to 0.6 T. With a saturation magnetic flux density below the range, there is a likelihood that a lowering of overwrite ability might occur and that a lowered Curie temperature might reduce thermal stability. Beyond the range, there is a likelihood that the resulting magnetic head might be adversely affected by increased magnetostriction and tend to be readily magnetized.

Preferably, the cores have an initial magnetic permeability of at least about 1,000 in a DC mode and a coercive force of up to 0.3 Oe.

Preferably, the gap-defining opposed surfaces of the first and second cores 1 and 2 are smoothed as by mirror finishing such that soft magnetic thin films may be subsequently formed thereon with ease.

The soft magnetic thin film 4 used in the MIG type magnetic head preferably has a saturation magnetic flux density Bs of at least 0.7 T. With a saturation magnetic flux density of less than 0.7 T, saturation recording of the magnetic layer having coercivity within the specific range would become difficult and the overwrite ability would become less acceptable. Preferably, the thin film has a Bs value of at least 0.8 T. No particular upper limit is needed for the Bs of the thin film although the upper limit of about 2.8 T is commercially imposed because of material composition and manufacture problems.

The soft magnetic thin film 4 may be formed from any desired materials, for example, Fe-Al-Si alloys such as Sendust, Fe-Al-Si-Ni alloys such as Super Sendust, Fe-Si alloys, Ni-Fe alloys such as Permalloy, and Fe-N alloys. The soft magnetic thin film 4 may be a multilayer film consisting of sub-layers of these Fe alloys.

The thickness of the soft magnetic thin film 4 is not particularly limited although it is generally 0.2 to 5 $\mu$m thick, preferably 0.5 to 3 $\mu$m thick. With a film thickness below this range, the soft magnetic thin film 4 would have an insufficient overall volume to resist saturation, often failing to perform the function of an MIG type magnetic head. Beyond the range, the soft magnetic thin film 4 would undergo excess abrasion and an increased eddy current loss.

The gap 5 is filled with a non-magnetic material, for example, silicon oxide, preferably $SiO_2$. The gap 5 may be formed by any desired methods, preferably by sputtering. The gap length may be determined in accordance with the recording wavelength although it generally ranges from about 0.2 to about 2.0 $\mu$m.

The first and second cores 1 and 2 are integrally joined through the gap 5, for example, by applying fusion welding glass to form the fusion weld 3. A suitable welding glass may be selected by taking into account various parameters although low melting glasses such as lead silicate glass are preferred because of low operating temperatures.

The MIG type magnetic head may be used either as a flying magnetic head of the monolithic type where the first and second cores serve as a slider or as a flying magnetic head of the composite type where such an MIG type magnetic head is integrally joined with a slider of non-magnetic ceramic such as $Al_2O_3$-TiC.

Figure 5:
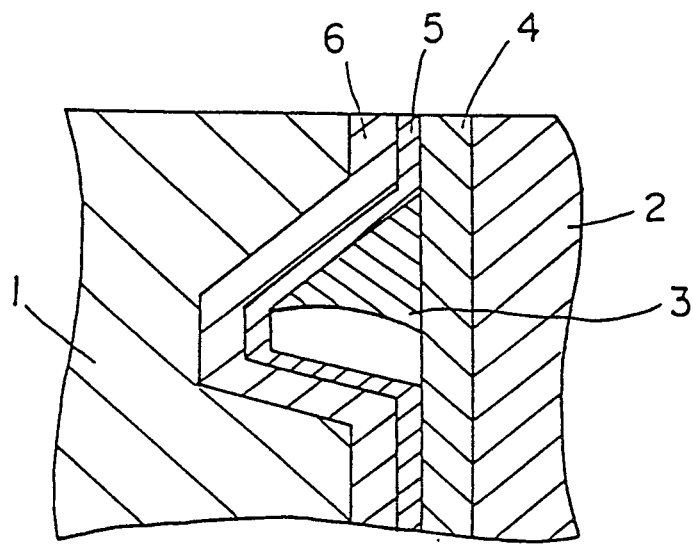

Also useful in the practice of the invention are magnetic heads of the enhanced dual gap length (EDG) type. The EDG type magnetic head is a modified MIG type magnetic head. As shown in FIG. 5, the EDG type magnetic head is the same as the MIG type magnetic head in that it has a pair of cores 1 and 2 and a soft magnetic thin film 4 on the second core 2, but different in that an alloy thin film 6 having a lower saturation magnetic flux density than the cores is formed on the first core 1. The EDG type magnetic head has the same advantages as the aforementioned MIG type magnetic heads and an additional advantage of higher sensitivity provided by the low saturation magnetic flux density alloy thin film. Such low saturation magnetic flux density alloy thin films may be formed from amorphous alloys having a relatively low saturation magnetic flux density as disclosed in U.S. Ser. No. 356,696 filed May 25, 1989.

Another useful magnetic head which can be used herein is a thin film type magnetic head. In general, the thin film type magnetic head has many benefits including high density recording and high speed data transfer.

Figure 6:
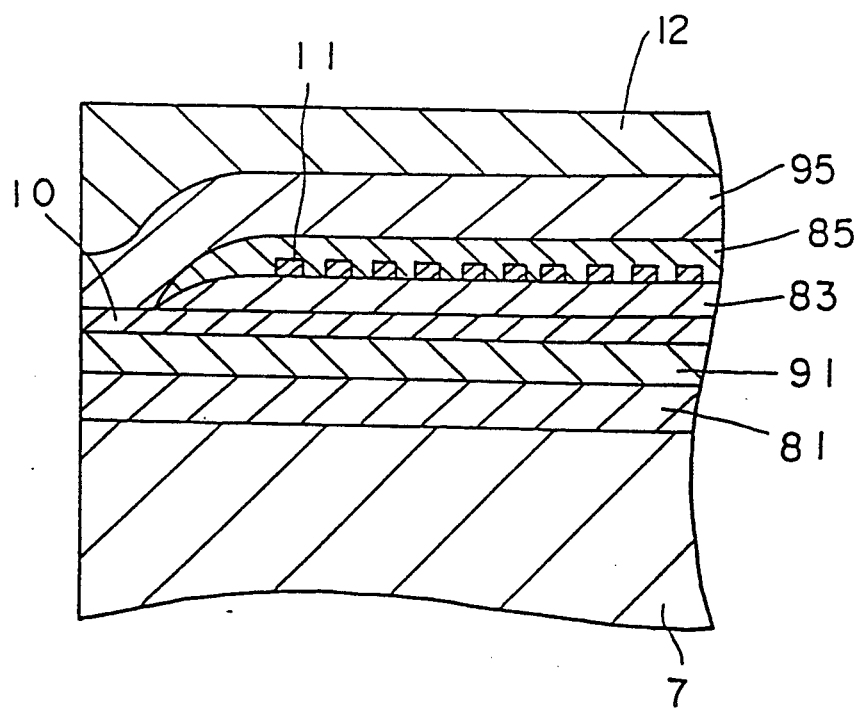
FIG. 6 is a fragmental cross section of a thin film type magnetic head useful in the magnetic recording and reproducing process of the present invention.

FIG. 6 is a cross section of a portion of a flying magnetic head of the thin film type for use in a preferred embodiment of the present invention. The flying magnetic head includes a slider or base 7, a first insulating layer 81, a lower pole layer 91, a gap layer 10, a second insulating layer 83, a coil layer 11, a third insulating layer 85, and an upper pole layer 95, and a protective layer 12 stacked in this order. The slider 7 and the layers define a flying or air bearing surface at left. A lubricating film may be applied to the flying surface of the head if desired.

The slider 7 may be formed from any well-known materials including ceramics and ferrites. Examples of ceramic materials include $Al_2O_3$-TiC base ceramic materials, $ZrO_2$ base ceramic materials, SiC base ceramic materials, and AlN base ceramic materials. They may contain an additional component(s) such as Mg, Y, $ZrO_2$, and $TiO_2$. The shape and dimensions of the slider 7 may be of conventional design.

The insulating layer 81 may be formed of any conventional well-known materials. For example, $SiO_2$, glass, $Al_2O_3$ and the like may be used if it is desired to form such layers by sputtering. The thickness and pattern of the insulating layer 81 may be of conventional design, and it is 5 to 40 μm thick, for example.

The magnetic poles are generally provided in the form of lower and upper pole layers 91 and 95 as illustrated in FIG. 6. Most often, the lower and upper pole layers 91 and 95 are soft magnetic thin films having a saturation magnetic flux density of at least 0.7 tesla (T) as in the case of the previously mentioned MIG and EDG type magnetic heads. Therefore, these pole layers may be formed from any of the soft magnetic materials previously mentioned in connection with the MIG type magnetic heads. It will be understood that the lower and upper pole layers 91 and 95 may be of the same or different composition. The magnetic pole layers 91 and 95 may be of conventional well-known design with respect to their pattern, thickness and the like. They may be about 1 to 5 μm thick, for example.

The gap layer or spacer 10 intervenes between the lower and upper pole layers 91 and 95. The gap layer 10 may be formed from any well-known materials including $Al_2O_3$ and $SiO_2$. The gap layer 10 may be of conventional well-known design with respect to its pattern, thickness and the like. It may be about 0.2 to 1.0 μm thick, for example.

The coil layer 11 may be formed from any desired material, generally from a metal such as aluminum and copper. No particular limits are imposed on the pattern and density of the coil. The coil may be wound in a well-known conventional manner. For example, the coil pattern may be of the spiral type illustrated in FIG. 6, laminate type or zigzag type. The coil layer 11 may be formed by any desired deposition techniques including sputtering, wet plating, and evaporating techniques.

In the illustrated embodiment, the coil layer 11 is spirally disposed between the lower and upper pole layers 91 and 95 while the insulating layers 83 and 85 intervene between the coil layer 11 and the lower and upper pole layers 91 and 95. The insulating layer 81 is disposed between the slider 7 and the lower pole layer 91. These insulating layers may be formed from any well-known materials. For example $SiO_2$, glass, and $Al_2O_3$ may be used when it is desired to form insulating thin films by sputtering.

The protective layer 12 is present on the top of the head, more specifically on the upper pole layer 95. The protective layer 12 may be formed from any well-known materials, for example, $Al_2O_3$. The protective layer 12 may be of conventional well-known design with respect to its pattern, thickness and the like. It may be about 10 to 50 μm thick, for example. An additional resinous coating may be applied to the protective layer, if desired.

Briefly stated, the process for producing such a thin film type flying magnetic head includes thin film formation and patterning. To form thin films which constitute the respective layers as described above, any well-known vapor phase deposition and wet deposition techniques may be used, for example, vacuum deposition, sputtering, and plating. The respective layers of the head may be patterned by selective etching or selective deposition, which are both well known in the art. The etching may be either wet or dry etching.

The flying magnetic head as far described is usually combined with well-known members such as an arm to form a head assembly.

According to the present invention, recording and reproducing operation may be carried out on the magnetic disk by rotating the disk relative to the flying magnetic head while keeping the head afloat. The flying height, that is, the spacing of the flying head away from the disk surface is usually set to at most 0.2 μm, preferably at most 0.17 μm. A flying height of more than 0.2 μm would detract from overwrite ability and fail to achieve a high recording density. It will be understood that the flying height can be minimized until a quasi contact state is established between the floating surface of the magnetic head and the surface of the magnetic disk. The flying height may be adjusted by changing the slider shape, gimbal and suspension loads, disk revolution and other parameters.

The revolution of the magnetic disk during recording/reproducing operation is not particularly limited and may be determined depending on the desired transfer rate, flying height, recording density and the like. The disk is most often rotated at about 1,500 to about 4,000 revolutions per minute (r.p.m.).

In the practice of the invention, digital signals are recorded in a saturation recording mode. The saturation recording enables overwrite recording.

The recording density which can be achieved by the present invention will vary with the coercive force and thickness of the magnetic layer, the gap length and flying height of the flying magnetic head, and other conditions. In most cases, a recording density of at least 35 kFRPI (kilo flux reverse per inch) as expressed in D50 is available. The D50 is a recording density at which an output decreases to 50% of the output of a solitary wave.

In addition, a commercially satisfactory overwrite ability of at most −30 dB is available.

EXAMPLE

Examples of the present invention are given below by way illustration and not by way of limitation.

EXAMPLE 1

Magnetic coating compositions were prepared.

| Ingredient | Parts by weight |
| --- | --- |
| Magnetic powder composition: α-Fe coercive force: 1340 length: 0.25 μm aspect ratio: 8 | 100 |
| α-$Al_2O_3$ | 10 |
| Epoxy resin, Epicoat 1004 available from Shell Chemical K. K. | 28 |
| Phenol resin, Sumilak PC25 available from Sumitomo Bakelite K. K. | 12 |
| Silicone oil | 0.4 |

-continued

| Ingredient | Parts by weight |
|---|---|
| Cyclohexanone/isophorone (1/1) | 340, 410, 570 or 650 |

It will be understood that the amount of the solvent mixture was changed for every sample. The foregoing ingredients were mixed and dispersed in a ball mill for 140 hours. The resulting compositions had a viscosity of 150 to 900 centipoise.

The magnetic coating compositions were applied to either surface of disk-shaped aluminum substrates of 3.5 inch diameter by spin coating under spinning-off conditions of 4,000 r.p.m. and 5 seconds so as to provide an average coating thickness of 0.15 to 0.35 μm at the end of curing.

The aluminum substrates used had a surface roughness Rmax of 0.038 μm and Ra of 0.002 μm.

By using the leveling apparatus shown in FIG. 2 having a pair of rod-shaped N-S opposed magnets disposed therein and rotating the disks therein, the coatings were leveled in an atmosphere containing cyclohexanone vapor in air at room temperature (23° C.). The magnetic field acting on the magnetic coating had an intensity of 970 G near the outer perimeter and 1530 G near the inner perimeter. The cyclohexanone solvent was heated at 35° C. The disks were rotated at 1,000 r.p.m. for 20 seconds.

The magnetic coatings were then subjected to magnetic orientation in the circumferential direction of the disks using an orientation means having opposed magnets. The orienting magnetic field had an intensity of 3,000 G, and the disks were rotated at 200 r.p.m. for 45 seconds.

The coatings were cured at 200° C. for 3 hours in a nitrogen stream and then polished to an abrasion depth of about 0.05 μm by means of a tape abrasion machine using abrasive tape WA10000 available from Nihon Micro-Coating K.K. for the fine adjustment of film thickness and the surface smoothing of the magnetic layer.

Subsequent to the polishing step, the disks were cleaned and then coated with a Flon solution of 0.1% fluorocarbon (KRYTOX 143CZ available from E. I. DuPont) by dipping for impregnation. The resulting disks are designated sample Nos. 1, 2, 3 and 4.

Comparative disk sample Nos. 5, 6, 7 and 8 were prepared by the same procedure as Example 1 except leveling was omitted.

The magnetic layers of these samples, Nos. 1 through 8, were measured for squareness ratio S, average film thickness $\bar{t}$, ratio of the film thickness $t_o$ at the outermost perimeter and the film thickness $t_i$ at the innermost perimeter ($t_o/t_i$), porosity, and maximum height Rmax as surface roughness.

The squareness ratio S was determined using a vibrating sample magnetometer (VSM) with a maximum magnetic field of 10 kG applied. The thickness of the magnetic layers was determined from the step between the magnetic layer surface and the exposed surface of a selected substrate area where no magnetic layer was formed, by means of Talistep probe type film thickness meter. The surface roughness Rmax and Ra were determined according to JIS B0601. The porosity was determined by image analysis of an SEM image with a magnification of 50,000.

The results are shown in Table 1.

TABLE 1

| Sample No. | Leveling | $\bar{t}$ (μm) | $t_o/t_i$ | Rmax (μm) | Ra (μm) | Porosity (%) | S |
|---|---|---|---|---|---|---|---|
| 1 | YES | 0.30 | 1.03 | 0.011 | 0.001 | 15 | 0.92 |
| 2 | YES | 0.20 | 1.05 | 0.013 | 0.002 | 12 | 0.91 |
| 3 | YES | 0.15 | 1.06 | 0.017 | 0.002 | 9 | 0.89 |
| 4 | YES | 0.10 | 1.02 | 0.019 | 0.002 | 7 | 0.87 |
| 5* | NO | 0.30 | 1.21 | 0.159 | 0.017 | 53 | 0.82 |
| 6* | NO | 0.20 | 1.13 | 0.127 | 0.014 | 55 | 0.75 |
| 7* | NO | 0.15 | 1.14 | 0.143 | 0.014 | 67 | 0.71 |
| 8* | NO | 0.10 | 1.11 | 0.100 | 0.012 | 71 | 0.67 |

*outside the scope of the invention

Magnetic recording/reproducing operation was conducted on magnetic disk sample Nos. 1 to 6 using a magnetic disk machine having a flying magnetic head mounted therein. Comparative sample Nos. 7 and 8 without leveling could not be evaluated for electromagnetic properties because their magnetic layers were poor. The magnetic head used was a monolithic MIG head having a gap length of 0.6 μm.

The flying height during recording/reproducing operation was 0.14 μm. The flying height is the spacing between the surface of the magnetic disk and the flying surface of the magnetic head at the gap. The flying height was measured by rotating a test quartz disk under the same conditions as for the sample disk in question, thereby causing the magnetic head afloat, directing white light to the gap of the magnetic head from the rear side of the quartz disk, detecting the interference between the reflected light and the reflected light from the disk surface, and calculating the flying height therefrom. For this measurement, an automatic flying height tester available from PPL was used.

The recording current was $I_{90} \times 2$ wherein $I_{90}$ is a recording current value corresponding to 90% of the maximum reproducing output from saturation recording.

Error rate

The error rate was evaluated by certifying the disk over its full surface at a recording frequency of 3.3 MHz and a track feed pitch of 15 μm and counting the number of fault signals.

Missing pulse (MP) errors are errors occurring when a signal is recorded in the disk and the output of a reproducing signal becomes lower than 65% of the total circumference average output (TAA).

Extra pulse (EP) errors are errors occurring when a signal is recorded and DC erased, and the residual signal after erasing is more than 25% of TAA.

D50, Reproduction output & Overwrite ability

A magnetic disk certifier was used. The recording density was changed by varying the recording frequency. D50 is a recording density at which the peak-to-peak (P-P) value of a reproduction output decreased to 50% of the P-P value of the solitary wave output. The reproduction output is a P-P value at a recording frequency of 3.3 MHz. The disk was rotated at 3,600 r.p.m. during measurement.

Overwrite ability (O/W) was evaluated by recording a signal having a frequency 1F of 1.65 MHz in the disk, recording another signal having a frequency 2F of 3.3 MHz thereover, and measuring the attenuation of 1F signal by means of a spectrum analyzer (Hughlet Packard). The disk was rotated at 3,600 r.p.m. during measurement.

S/N ratio

The S/N ratio was measured at the innermost perimeter of the disk by writing a signal at a recording frequency of 3.3 MHz and measuring a reproduction output (Vrms) in the band of 10 MHz by means of an AC voltmeter. DC erasing was repeated 3 times at this track before measuring a reproduction output (Vdcrms) by means of an AC voltmeter. With the head loaded on the disk, the system noise (Vnoise) was measured. Then the S/N ratio was calculated from the following formula.

$$S/N = Vrsm/(Vdcrms^2 - Vnoise^2)^{\frac{1}{2}}$$

The results are shown in Table 2.

TABLE 2

| Sample No. | Error rate (errors/disk) MP | Error rate (errors/disk) EP | D50 (kFRPI) | O/W (dB) | S/N (dB) |
|---|---|---|---|---|---|
| 1 | 0 | 0 | 36.5 | −36.8 | 35.7 |
| 2 | 0 | 0 | 38.2 | −37.5 | 33.5 |
| 3 | 0 | 0 | 41.0 | −38.1 | 31.9 |
| 4 | 3 | 1 | 43.4 | −39.0 | 30.3 |
| 5* | >5000 | 1060 | 30.9 | −27.2 | 29.5 |
| 6* | >5000 | 3290 | 32.8 | −28.0 | 27.2 |

*outside the scope of the invention

The effectiveness of the invention is evident from Tables 1 and 2.

Equivalent results were obtained when Ba ferrite was used as the magnetic submicron particles and a radiation curable resin was used as the binder.

EXAMPLE 2

Preparation of coating magnetic disks

By following the procedure for the disks within the scope of the invention in Example 1, there were fabricated magnetic disk samples No. 13 and 14 with magnetic layers having different coercive forces. The magnetic layer of each disk had an average film thickness of 0.15 μm and a surface roughness Ra of 0.002 μm. The magnetic layers had a porosity of 7% for No. 13 and 11% for No. 14.

Comparative disk sample Nos. 15, 16 and 17 were prepared as above (by the same procedure as Example 1) except leveling was omitted.

The magnetic powders used in the respective magnetic disks had the composition, coercive force Hc, particle length, and aspect ratio (length/breadth) as shown in Table 3.

TABLE 3

| Magnetic disk No. | Composition | Magnetic powder Hc (Oe) | Magnetic powder Length (μm) | Magnetic powder Aspect ratio |
|---|---|---|---|---|
| 15 | Co-γ-Fe$_2$O$_3$ | 770 | 0.30 | 8 |
| 13 | α-Fe | 1230 | 0.30 | 7 |
| 3, 16, 17 | α-Fe | 1340 | 0.25 | 8 |
| 14 | α-Fe | 1500 | 0.20 | 7 |

Preparation of thin film magnetic disks

There were fabricated magnetic disk sample Nos. 18 and 19 with magnetic layers having different coercive forces.

Disk-shaped aluminum substrates of 3.5 inch diameter were coated with an Ni-P undercoat of 20 μm thick by electroless plating, surface smoothed by means of an abrasive polishing machine, texture worked with abrasive tape WA4000, and then cleaned.

Using a magnetron sputtering apparatus, a Cr layer of 0.2 μm was formed on the undercoat and then a Co-Ni-Cr alloy magnetic layer of 0.05 μm was formed thereon. The coercive force of the magnetic layer was changed by controlling the substrate heating conditions and Ar gas pressure.

Then a protective carbon film of 0.04 μm thick was formed on the magnetic layer by RF magnetron sputtering. A 0.1% Flon solution of fluorocarbon FOMBLIN AM2001 (Montefluous S.A.) was applied to the carbon film to form a protective lubricant film.

Preparation of monolithic type flying magnetic heads

A magnetic head designated C was manufactured by machining sintered Mn-Zn ferrite blocks having a saturation magnetic flux density of 0.36 T, and joining them with a low-melting glass being fusion welded. The resulting magnetic head core defined a gap filled with SiO$_2$ and having a length of 0.6 μm. The magnetic head core was provided with 24 turns of Cu coil, obtaining a monolithic flying magnetic head. The head was assembled with a gimbal and an arm to complete magnetic head C.

An MIG type magnetic head designated A of the structure shown in FIG. 3 was manufactured by machining a V-shaped groove in a sintered Mn-Zn ferrite block, forming a Sendust film having a saturation magnetic flux density of 1.1 T and a thickness of 2 μm by magnetron sputtering, further machining the block, and following the same procedure as in head C.

Additional MIG type magnetic heads A1 and A2 were manufactured by the same procedure as head A except that the core configuration to form the slider was changed.

The saturation magnetic flux density Bs in proximity to the gap of these magnetic heads are shown in Table 4.

Preparation of thin film type flying magnetic heads

A thin film type magnetic head of the structure shown in FIG. 6 was manufactured by successively stacking an insulating layer 81, a lower pole layer 91, a gap layer 10, an insulating layer 83, a coil layer 11, an insulating layer 85, an upper pole layer 95 and a protective layer 12 on a slider 7. Each layer was formed by sputtering and patterned by dry etching.

The slider 7 was formed of Al$_2$O$_3$-TiC. The insulating layer 81 was formed of Al$_2$O$_3$ and 30 μm thick. The upper and lower pole layers 91 and 95 were formed by magnetron sputtering Permalloy having a saturation magnetic flux density of 0.8 T to produce films having a thickness of 1.7 μm and 2.0 μm, respectively. The gap layer 10 was formed of SiO$_2$ and had a gap length of 0.65 μm. The coil layer 11 was spirally formed using Cu. The insulating layers 83 and 85 were formed of Al$_2$O$_3$. The protective layer 12 was formed of Al$_2$O$_3$ and 40 μm thick.

Magnetic recording/reproducing operation was conducted on these magnetic disks using these flying magnetic heads in the combination shown in Table 4. They were evaluated for D50 and overwrite ability as well as the following properties.

Coercive force (Hc)

Coercive force was measured under a maximum magnetic field of 10 kG applied using a vibrating sample magnetometer (VSM).

Coefficient of friction (μ)

Coefficient of friction was measured according to the ANSI standard with a head load of 15 grams and a relative speed of 5 mm/sec.

CSS durability

A contact-start-and-stop (CSS) test was carried out using a 3.5" magnetic disk drive available from Plus K.K. One cycle of the CSS test included a quiescent time of 10 sec., a rise time of 5 sec., a steady rotation time of 10 sec., and a fall time of 30 sec. The steady rotation was at 3,600 r.p.m. Measurement was done at a location spaced 22 mm from the disk center. The CSS cycle was repeated until the coefficient of friction of the disk reached or exceeded 1.0 and the magnetic layer of the disk was damaged.

The results are shown in Table 4.

Combination Nos. 11 and 12 using thin film type magnetic disks were least durable in CSS due to an increased coefficient of friction.

Further tests were carried out on the same combinations as Nos. 1 to 6 except that the flying height was in excess of 0.20 μm, finding a loss of D50 and overwrite ability.

Equivalent results were obtained with magnetic disk sample Nos. 13 and 14 where Ba ferrite was used as the magnetic submicron particles.

EXAMPLE 3

There were furnished disk-shaped aluminum substrates of 3.5" diameter which had been polished to a desired surface roughness Ra. The Ra values of the substrates are shown in Table 5.

Several magnetic disk samples were fabricated by the procedure of Example 1.

Both disk sample Nos. 20–33 in which the coating was leveled in an atmosphere containing cyclohexanone vapor as in Example 1 and disk sample Nos. 34–36 in which the leveling of the coating was omitted were polished on the magnetic layer to varying surface

TABLE 4

| Combination No. | Magnetic disk Sample No. | Hc (Oe) | t (μm) | Magnetic head Type | Bs (T) | Flying height (μm) | $D_{50}$ (kFRPI) | O/W (dB) | μ | CSS (cycles) |
|---|---|---|---|---|---|---|---|---|---|---|
| 1 | 13 | 1210 | 0.15 | A | 1.1 | 0.14 | 35.2 | −40.5 | 0.11 | $>3 \times 10^5$ |
| 2 | 3 | 1310 | 0.15 | A | 1.1 | 0.14 | 41.0 | −38.1 | 0.11 | $>3 \times 10^5$ |
| 3 | 14 | 1430 | 0.15 | A | 1.1 | 0.14 | 45.4 | −36.2 | 0.12 | $>3 \times 10^5$ |
| 4 | 3 | 1310 | 0.15 | B | 0.8 | 0.14 | 40.7 | −38.5 | 0.10 | $>3 \times 10^5$ |
| 5 | 3 | 1310 | 0.15 | A1 | 1.1 | 0.10 | 43.3 | −42.0 | 0.11 | $>3 \times 10^5$ |
| 6 | 3 | 1310 | 0.15 | A2 | 1.1 | 0.05 | 52.1 | −45.8 | 0.11 | $>3 \times 10^5$ |
| 7* | 15 | 750 | 0.60 | C | 0.36 | 0.14 | 23.0 | −34.0 | 0.13 | $>3 \times 10^5$ |
| 8* | 15 | 750 | 0.60 | A | 1.1 | 0.14 | 24.5 | −47.0 | 0.13 | $>3 \times 10^5$ |
| 9* | 16 | 1310 | 0.60 | A | 1.1 | 0.14 | 33.0 | −28.0 | 0.12 | $>3 \times 10^5$ |
| 10* | 17 | 1310 | 1.00 | A | 1.1 | 0.14 | 30.0 | −24.5 | 0.12 | $>3 \times 10^5$ |
| 11* | 18 | 980 | 0.05 | A | 1.1 | 0.14 | 39.0 | −42.0 | 0.21 | 12000 |
| 12* | 19 | 1310 | 0.05 | A | 1.1 | 0.14 | 42.0 | −40.5 | 0.23 | 8000 |

*outside the scope of the invention
Note for Table 4:
Head
A, A1, A2: MIG type head
B: thin film type head
C: ferrite head
Disk
15: Co—γ—$Fe_2O_3$ coated disk
3/13/14/16/17: α-Fe coated disk
18/19: Co—Ni—Cr thin film disk
*Combination Nos. 7 to 12 are outside the scope of the invention.

The data of Table 4 demonstrate the benefits of the invention.

More particularly, combination Nos. 1 to 6 in accordance with the invention showed satisfactory results including a D50 of more than 35 kFRPI, an overwrite ability of at most −30 dB, and CSS durability.

In contrast, combination Nos. 7 and 8 using a magnetic disk coated thereon a Co-γ-$Fe_2O_3$ base magnetic layer showed a low D50 despite satisfactory CSS durability and overwrite ability.

Combination Nos. 9 and 10 where the magnetic layers were in excess of 0.5 μm thick showed unacceptable overwrite ability.

roughness (Ra) by means of a tape abrasion machine using different abrasive tapes WA4000 to WA10000 (Nihon Micro-Coating K.K.).

The Ra, porosity, and average film thickness $\bar{t}$ of the magnetic layers are shown in Table 5.

It is to be noted that the magnetic layers of sample Nos. 20 to 23 had a thickness ratio of $t_o/t_i$ of from 1.02 to 1.04 and a squareness ratio S of from about 0.90 to about 0.92.

Recording/reproducing operation was conducted on the disk samples at a flying height of 0.14 μm in order to evaluate S/N ratio, overwrite ability, and D50 as in Example 1. CSS durability was also evaluated as in Example 2.

The results are shown in Table 5.

TABLE 5

| Sample No. | Leveling | Substrate Ra (μm) | Magnetic layer Ra (μm) | Porosity (%) | $\bar{t}$ (μm) | S/N (dB) | O/W (dB) | $D_{50}$ (kFRPI) | CSS (cycles) |
|---|---|---|---|---|---|---|---|---|---|
| 20 | YES | 0.006 | 0.003 | 17 | 0.3 | 32.7 | −36.2 | 36.0 | $>3 \times 10^5$ |

TABLE 5-continued

| Sample No. | Substrate Leveling | Substrate Ra ($\mu$m) | Magnetic layer Ra ($\mu$m) | Porosity (%) | t ($\mu$m) | S/N (dB) | O/W (dB) | $D_{50}$ (kFRPI) | CSS (cycles) |
|---|---|---|---|---|---|---|---|---|---|
| 21 | YES | 0.006 | 0.001 | 15 | 0.3 | 33.9 | −36.9 | 36.5 | >3 × 10$^5$ |
| 22 | YES | 0.004 | 0.003 | 17 | 0.3 | 33.1 | −36.5 | 36.3 | >3 × 10$^5$ |
| 23 | YES | 0.004 | 0.001 | 13 | 0.3 | 34.5 | −37.3 | 36.5 | >3 × 10$^5$ |
| 24* | YES | 0.004 | 0.003 | 3 | 0.3 | 33.4 | −36.7 | 36.5 | 0(head adhered) |
| 25* | YES | 0.004 | 0.001 | 3 | 0.3 | 34.7 | −37.5 | 35.0 | 0(head adhered) |
| 26* | YES | 0.010 | 0.001 | 25 | 0.3 | 28.5 | −29.5 | 32.0 | >3 × 10$^5$ |
| 27* | NO | 0.004 | 0.013 | 58 | 0.3 | 25.5 | −29.7 | 30.5 | 25000 |
| 28* | NO | 0.006 | 0.015 | 47 | 0.3 | 24.7 | −27.6 | 29.7 | 30000 |
| 29* | YES | 0.010 | 0.003 | 29 | 0.3 | 27.8 | −28.3 | 33.2 | >3 × 10$^5$ |
| 30* | NO | 0.010 | 0.017 | 51 | 0.3 | 24.1 | −27.5 | 28.3 | 1.1 × 10$^5$ |

*outside the scope of the invention

The effectiveness of the invention is evident from Table 5.

Sample Nos. 20 to 23 within the scope of the invention showed error rates MP and EP of both 0.

Further tests were carried out on these samples except that the flying height was in excess of 0.20 $\mu$m, finding a loss of D50 and overwrite ability.

Equivalent results were obtained when Ba ferrite was used as the magnetic submicron particles and a radiation curable resin was used as the binder.

It is thus evident that the magnetic disks of the present invention show improved electromagnetic properties such as S/N ratio and CSS durability during recording/reproducing operation.

The method for preparing magnetic disks according to the present invention permits the magnetic layer to be formed to a reduced thickness, uniform dispersion of magnetic submicron particles, minimized surface roughness, and low porosity. It enables to form magnetic layers to an extremely reduced thickness which contain magnetic submicron particles such as ferromagnetic metal submicron particles and Ba ferrite submicron particles which are otherwise difficult to form a thin layer because of agglomeration of particles.

There are obtained magnetic disks having a magnetic layer which contains magnetic submicron particles in a high degree of orientation and has a high squareness ratio so that recording and reproducing operation can be made with minimal modulation and minimal error rate.

The present invention also provides a magnetic recording/reproducing process capable of high density recording in a reliable manner at a low cost.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A method for preparing a magnetic disk comprising the steps of:
   coating an annular rigid substrate with a magnetic coating composition containing magnetic submicron particles,
   applying a magnetic field to the coated substrate in a solvent vapor while rotating the substrate, thereby leveling the coating, and
   effecting orientation of the magnetic particles.

2. The method of claim 1 which further comprises after the step of effecting orientation, the step of curing the coating to form a magnetic layer having a thickness of 0.5 $\mu$m, a surface roughness Ra of up to 0.005 $\mu$m, and a porosity of 4 to 45%.

3. The method of claim 1 or 2 wherein the magnetic field applied for leveling the magnetic coating is a magnetic field created between opposed magnetic poles of opposite polarities across the substrate, said magnetic field having a higher intensity near the inner perimeter than near the outer perimeter of the substrate.

* * * * *